P. R. PETERSON.
POWER TRANSMISSION MACHINE.
APPLICATION FILED DEC. 30, 1918.

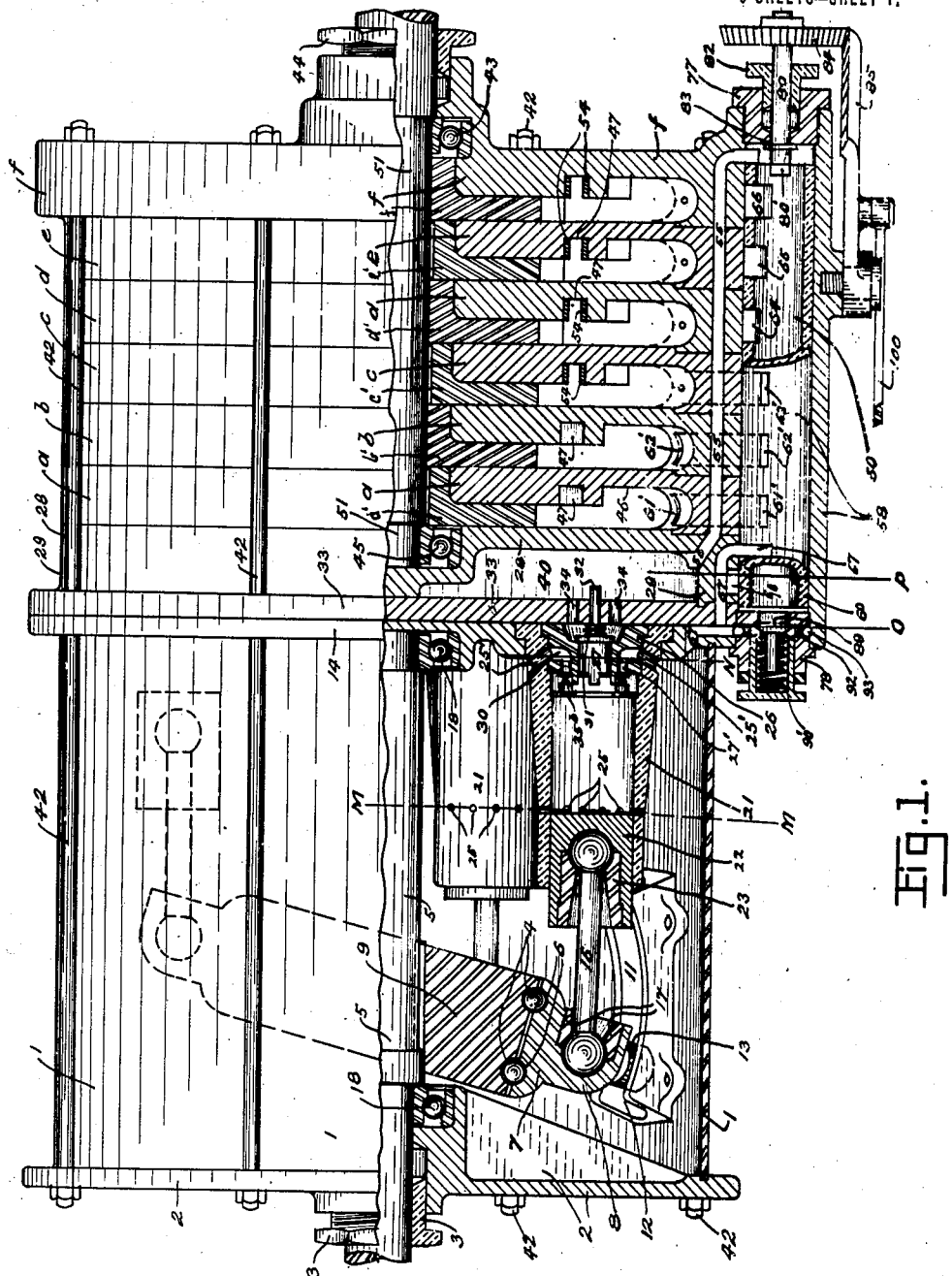

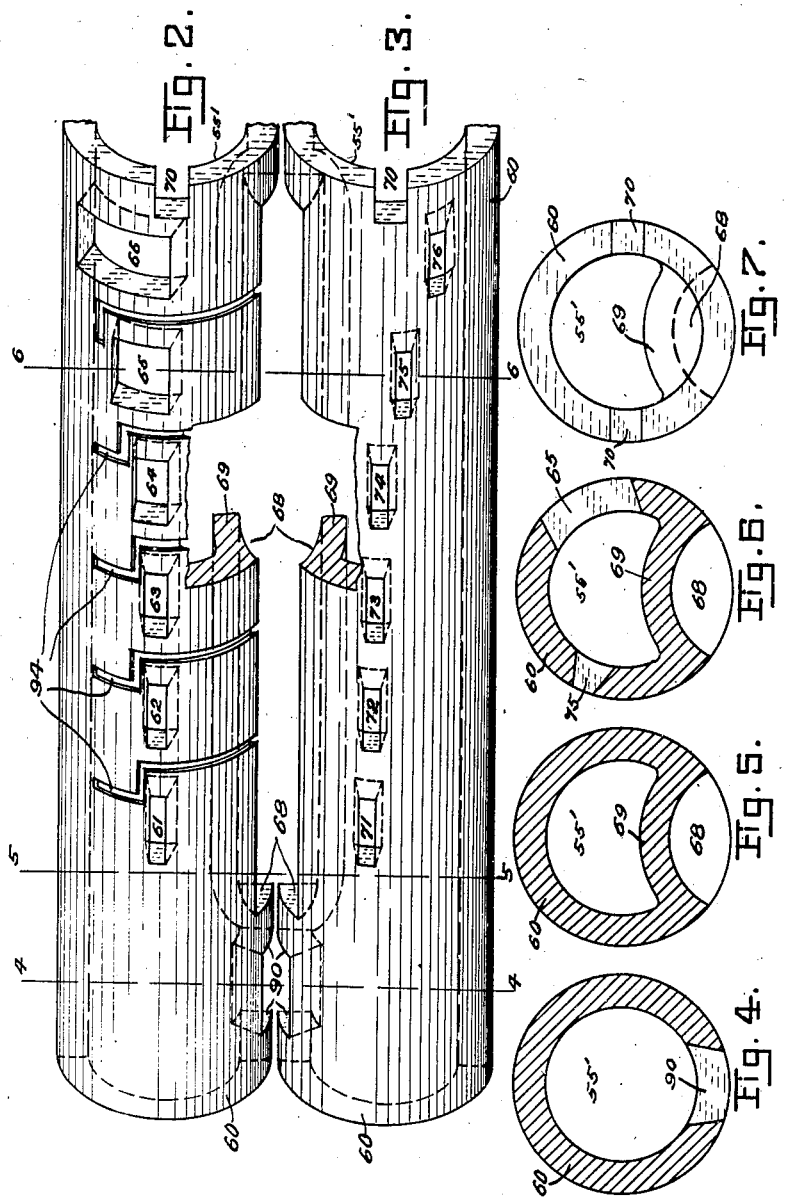

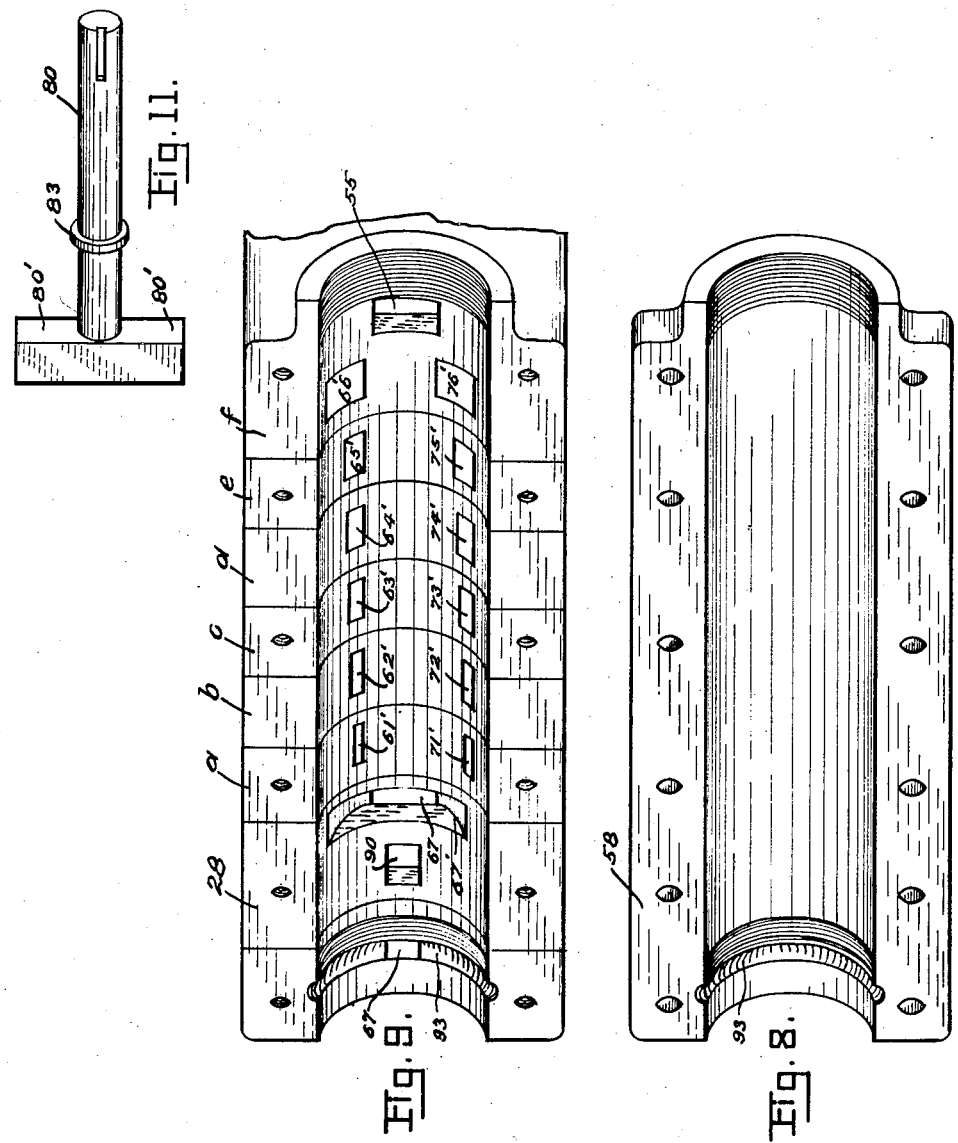

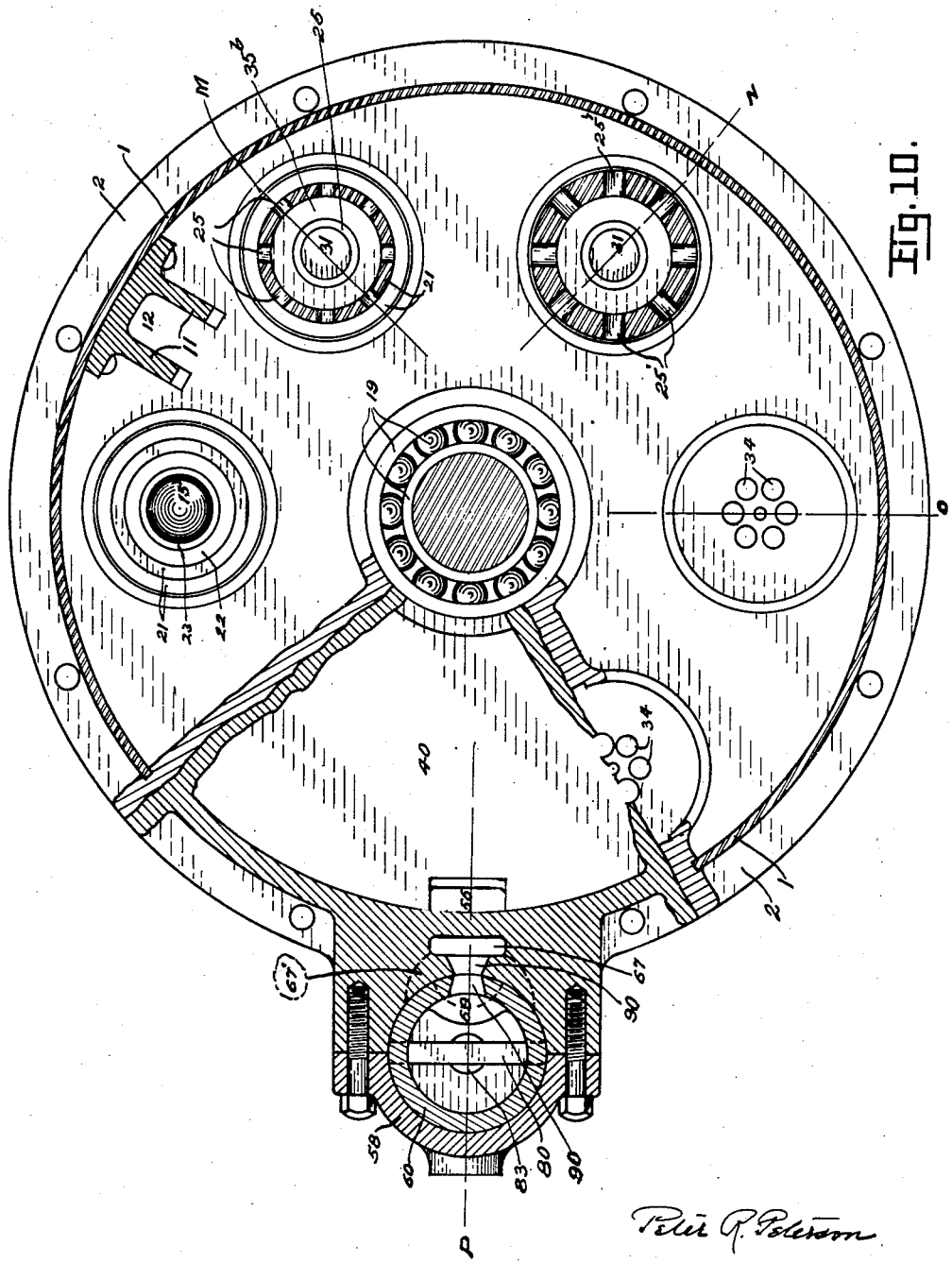

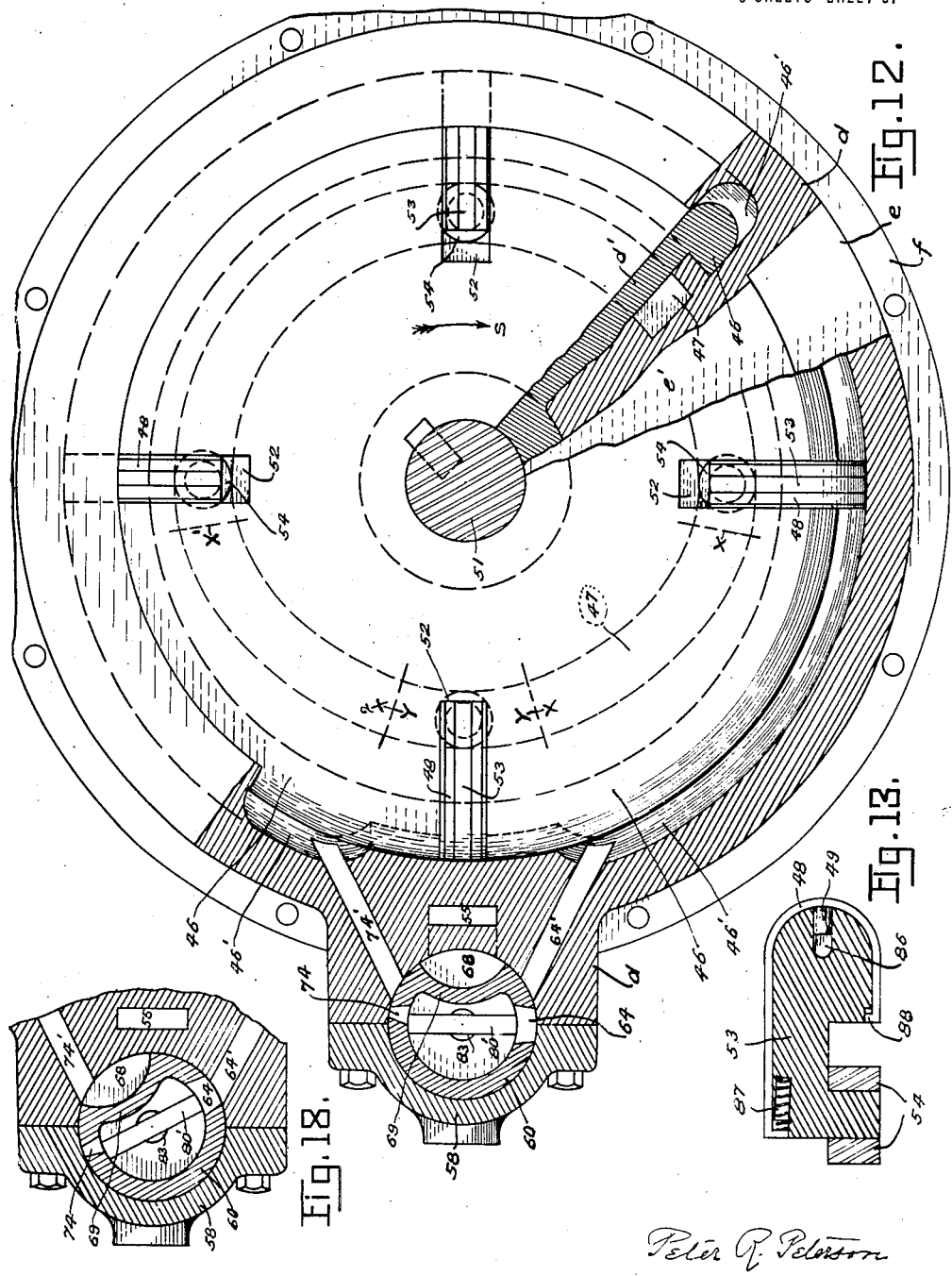

1,354,209.

Patented Sept. 28, 1920.
6 SHEETS—SHEET 6.

Peter R. Peterson
INVENTOR.

BY J. M. Thomas
ATTORNEY

United States Patent Office.

PETER R. PETERSON, OF SALT LAKE CITY, UTAH, ASSIGNOR TO PETERSON-HARNDEN FLUID CLUTCH CO., OF SALT LAKE CITY, UTAH, A CORPORATION.

POWER-TRANSMISSION MACHINE.

1,354,209.   Specification of Letters Patent.   Patented Sept. 28, 1920.

Application filed December 30, 1918. Serial No. 268,984.

*To all whom it may concern:*

Be it known that I, PETER R. PETERSON, a citizen of the United States, residing at Salt Lake City, in the county of Salt Lake and State of Utah, have invented certain new and useful Improvements in Power-Transmission Machines, of which the following is a specification.

My invention relates to power transmission and has for its object to provide a compact efficient hydraulic power machine by which the rotary motion of a shaft may be transmitted without the use of gears or friction disks. These objects I accomplish with the machine illustrated in the accompanying drawings in which similar letters and numerals of reference indicate like parts throughout the several figures and as described in the specification forming a part of this application and pointed out in the appended claims.

Figure 15:
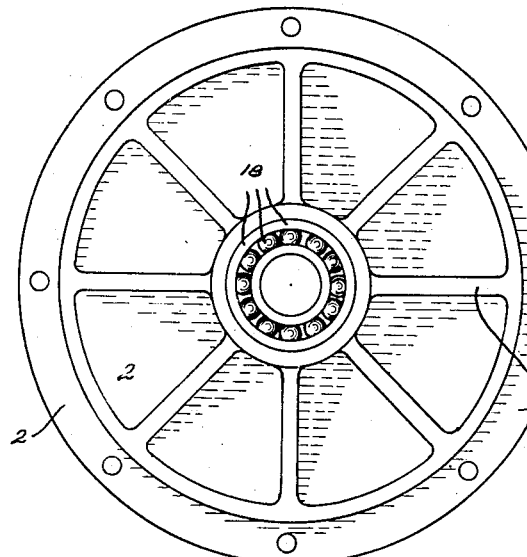
Figure 14:
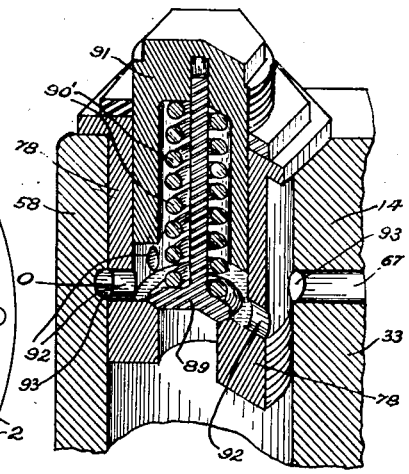
Figure 16:
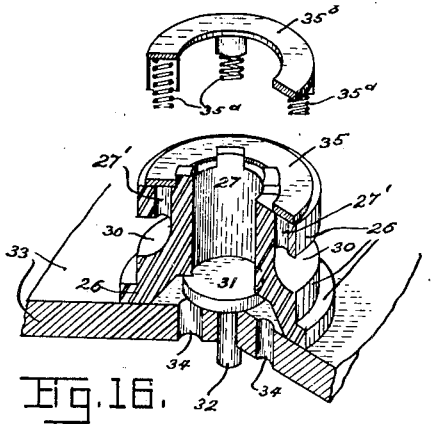
Figure 17:
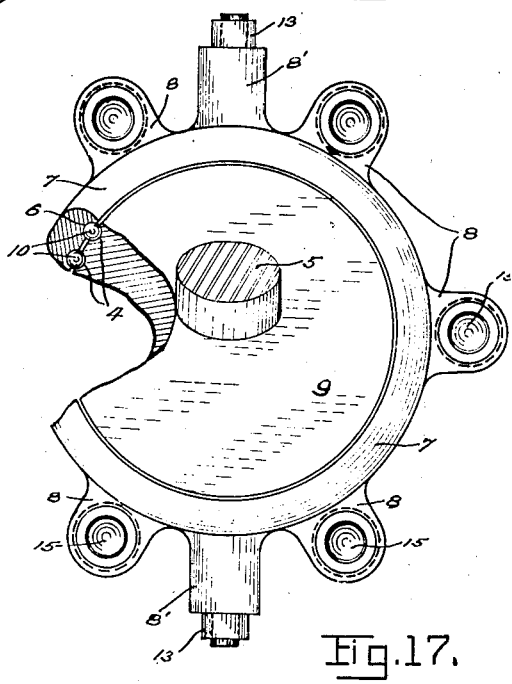

In the drawings in which I have shown a substantial embodiment of my invention Figure 1 is a side elevation of the same with one portion shown in longitudinal section, parts cut away, and parts shown in dotted lines. Fig. 2 is a side elevation of one side of the controlling valve, parts cut away, and parts shown in dotted lines. Fig. 3 is the other half of said valve with parts cut away and parts shown in dotted lines. Fig. 4 is a transverse section on line 4—4 of Fig. 2. Fig. 5 is a transverse section on line 5—5 of Fig. 2. Fig. 6 is a transverse section on line 6—6. Fig. 7 is an end view of the valve as shown in Figs. 2 and 3. Fig. 8 is a view in perspective showing the inside of the valve case. Fig. 9 is a view in perspective showing other half of the valve case, parts cut away. Fig. 10 is an end elevation showing transverse cuts through the rotor portion of my machine as indicated on lines M, N, O and P. The portion shown as M being a cut on line M of Fig. 1. The portion shown as N being a transverse cut on line N of Fig. 1. O being a transverse cut on line O of Fig. 1, and P being a transverse cut on line P of Fig. 1. Fig. 11 is a view in perspective of the valve stem. Fig. 12 is transverse section through one of the rotors with parts cut away showing the oil conduits and cam track. Fig. 13 is a radial section through one of the vanes. Fig. 14 is a view in perspective of a section through the safety valve, parts of the case shown in section. Fig. 15 is an elevation of the inside of the end plate 2. Fig. 16 is a view in perspective of one of the valve plugs used in the piston chambers. Fig. 17 is an inverted plan view of the driving rotor, parts cut away. Fig. 18 is a transverse section showing the valve turned to intermediate position.

The present invention consists of a cylindrical casing 1, one end of which is closed by the braced circular end 2. A stuffing box 3 is provided on the said end 2 to prevent any escape of the oil used in my machine. A rotor is secured on the driving shaft 5 and is positioned at an incline from its axis and is operated within said casing 1. The said rotor R consists of a shaft piece 9 which is keyed on said shaft 5, and said shaft piece has two annular grooved ball races 4 cut in its periphery each of which is semi-circular in cross section. An annular member 7 having radially extended lug portions 8 is carried on the adjacent periphery of said shaft piece 9 by the balls 10 which are carried and operated in said ball races 4 and similar races 6 which are cut in the inner face of said annular member 7. Bearing guides 11 are secured to the inner wall of said casing 1 each having a longitudinal channel 12 formed therein, and in which is operated the roller bearings 13 that in turn are mounted on extensions formed on the radial lugs 8' of said annular member 7. The said bearing guides 11 act as a guide for the oscillating movement of said annular member 7. A plurality of sockets 15 are bored in one side face of said lugs 8 of said member 7 and within said sockets are operatively carried one end of the dumb-bell connecting rods 16 and the spherical end of each of said dumb-bell rods 16 is held in one of said sockets 15 by the bearing blocks 17 which are to be screwed into said sockets after the ends of said rods 16 are in place, and each of said bearing blocks 17 is bored to conform with the spherical end of said rod 16 and to allow free movement of said rod therein. Ball bearings 18 are provided in a portion of said end 2 for said shaft 5, and similar bearings 19 are provided for said shaft in the end plate 14 which is secured on the end of said casing 1. Within the said end plate are mounted a plurality of pump cylinders 21 which are positioned parallel with said shaft 5, and in each of said cylinders 21 one of the pistons 22 is operated, and each of said pistons 22 is bored to receive one end of one of said dumb-bell connecting rods 16. In each of said pistons 22 is screwed a threaded block 23 similar to the said blocks 17 to hold the end of its connecting rod 16. A plurality of ports 25 are bored through the wall of said cylinders 21 connecting the interior of said cylinders with the interior of said casing 1. A valve mechanism is secured in one end of each of said cylinders, said mechanism consists of a plug 26 having an annular recess or chamber 30 cut around said plug which connects through ports 25', which are bored in the walls of said cylinders 21, with the interior of said casing 1. The central portion of said plug 26 is bored out as at 27 and a valve 31 seats against the uncut portion of said plug 26 to control the flow of oil therethrough. The stem 32 of said valve 31 is slidably carried in the partition member 33 that is secured between the said end member 14 and the circular piece 28, which circular piece 28 has a flange 29 formed thereon and the space inclosed by said flange 29, circular piece 28 and partition member 33 form the annular fluid chamber 40. A plurality of ports 34 are bored through the said partition member 33 to allow the oil to flow therethrough from the interior of said cylinders 21 into said fluid chamber 40, and a spring carried on said stem 32 normally holds said valve 31 seated and when said valve is unseated by the operation of the piston 21 the fluid may pass through the openings or ports 34 cut in said partition member 33. A common flat valve 35 in the form of an annular disk seats over the said ports 27 to regulate the flow of fluid from the annular chamber 30 to the interior of the chamber 21. The said valve 35 is normally held in seating position by the springs 35ª that are secured at one end in a plate 35ᵇ which is adjusted or secured in the interior of said chambers 21.

A plurality of disk plates a, b, c, d, e and f are held contiguous and against the said circular piece 28 by the bolts 42 which are passed through the said disk plate f, the partition member 33, plate 14 and the end piece 2. The said disk plates, a, b, c, d, and e are all alike while the outer face of said disk plate f has a flange centrally thereon in which is carried the ball bearings 43 for the driven shaft 51, and the stuffing box 44.

In the said circular plate 28 is carried another set of ball bearings 45 for said shaft 51. A detail of one of said disk plates is shown in Fig. 12 and each of said disk plates consists of a circular piece of metal, in one side face of which is cut an annular recess 46, and the cam track 47. A portion of the periphery of said recess 46 is cut out and formed into an oil conduit 46' which conduit does not extend between the conduits 64' and 74'. The oil conduits 61' to 66' and 71' to 76' inclusive are cut through the outer wall of said disk plates two in each and connect with the interior of a valve chamber 50 through ports in a cylindrical valve 60. The rotors a', b', c', d', e' and f' are keyed on the driven shaft 51 and are operated in the recess 46 of said disk plates. In each of said rotors a' to f' respectively a radially disposed slot 52 is cut and within which slots 52 the vanes 53 are carried and operated. Each of said vanes consists of a piece of metal, rectangular in cross section and the outer end is formed semi-circular to conform to the wall of said recess 46. Each vane has a roller bearing 54 carried on one side edge which roller is operated in the cam track 47 of said disk plate.

An intake port 55 is cut transversely through said disk plates, all of which ports 55 are in alinement and connect with a port 56 cut transversely through said circular plate 28 to form the ingress conduit leading from said oil chamber 40 to the end of said valve chamber 50. The said valve chamber 50 is formed by the half plate 58 which is screwed on the coacting side face of said disks a to f respectively and bored out to form the valve chamber 50. A cylindrical valve 60 is operated within said chamber 50, and in the wall of said valve 60 are cut the ports 61, 62, 63, 64, 65, and 66. The said ports are longitudinally in alinement on one side, as will clearly appear in Fig. 2, and some of which increase in size in lateral direction, so that when all six are open a predetermined amount of flow will take place. When said valve is rotated and port 61 is closed the same amount of flow may take place in the five ports remaining open, and when the valve is again rotated to close port 62 an equal flow may pass through the other ports 63, 64, 65 and 66, and continuing the rotation of said valve until only port 66 is open an equal amount of flow may take place through that port on account of its size being laterally greater than the other of said ports. One other port is cut in said valve called the neutral port, and shown at 90, equal in size to said port 65 and positioned adjacent the said port 61. The reverse ports 71, 72, 73, 74, 75 and 76 are also cut in said valve and so positioned circumferentially in said valve as to present to the eye a curve similar to that of the increased side of said ports 61 to 66 inclusive but curved in the reverse direction so that all will remain open and carry the same flow although the valve may be rotated slightly in operation. A medial portion on one side of said valve is cut out or omitted in construction to form a longitudinally disposed exhaust or return conduit 68, and an arc shaped web portion of said valve shown at 69 forms a part of the wall of said conduit 68, and the other portion of the wall of said conduit is formed by the casing of said chamber 50. Openings 70 are cut in the end of said valve in which the valve stem of said valve is operated.

A semi-cylindrical half plate 58 is bolted on the edge of said plate 28 and disk plates *a* to *f* inclusive to form said valve chamber 50. The portion of each of the edges of said plates 28, *a*, *b*, *c*, *d*, *e*, and *f* is formed into the coacting one half of said valve casing and with its other half, the plate 58, and the end closures, (a threaded plug 77 at one end and the safety valve casing 78 and valve 79 at the other end) form the said chamber 50. The valve stem 80 is carried in the said threaded plug 77 and packing nut 82. The said valve stem is shown in detail in Fig. 11 and has two radially extended lugs 80' formed as a T which lugs are operated in the said openings 70 in the end of said valve 60. A flanged collar 83 is secured on said stem 80 or formed integral therewith which bears against the said plug 77 to hold the said lugs 80' within said openings 70, and a bevel gear 84 is secured on the end of said valve stem by which said stem and valve are rotated. A segment bevel gear 85 is mounted on the side of said half plate 58 the teeth of which mesh with the teeth of said bevel gear 84. The portions of said plate 28 and of the disk plate *a* to *f* inclusive which are extended are bored to form the said valve chamber 50 as shown in Fig. 9 with the ports cut therein to co-act with the ports 61 to 67 inclusive and 71 to 76 inclusive of the valve 60. In detail they are as follows, the port 61' coacts with port 61 and without naming each one, the ports in the respective plates as shown in Fig. 8 will have the same reference character with the prime character added to distinguish the port in the plates from the co-acting ports in the valve.

To insure a working contact between the semi-circular end of the said vanes 53 and the wall of said recess 46 and conduit 46', a packing ring 48 is carried around the wearing faces of said vanes 53, and a plunger 49 is carried and operated in a hole 86 which is bored into the end of said vane 53, and with an opening leading to the rear side of said vane. A spring 87 is carried in a recess cut in said vane, which spring normally holds said packing ring closely against the end of said vane, but when oil is under the pressure of said pistons 22 and flowing in the conduit 46' it will enter the hole 86 and force the said plunger 49 and therewith the packing ring 48 into wearing contact with the wall of said conduit 46'. The limit of the movement of said packing ring 48 is determined by a short bend in one end portion of said spring, which bend operates in a slot 88 and the compression of said spring 87. The radial movement of said vanes 53 is controlled by the action of the cam rollers 54 in the cam track 47 which is concentric for the most of its circumference but is eccentric from the points *x* to *x* and is again concentric from the points *y* to *y*.

The safety valve 89 is normally held seated against the safety casing 78 by the spiral spring 90' which is carried in a recessed plug 91 which in turn is screwed into said casing 78. Radial ports 92 are bored in said casing 78, which open into an annular port 93 that in turn connects with the exhaust or return port 67. Anti-vacuum ports 94 are cut in the outer face of said valve 60 which connect with the said port 68 and are used to prevent a tendency to create a vacuum when said rotors *a* to *f* are rotated but through which the operative oil is not active.

My machine may be used to transmit power from any driving shaft to an alined driven shaft, and for purpose of illustration let me assume the use to be on an automobile, and with oil supplied to fill the interior of the casing 1, chambers 21, chamber 40, conduits 46', conduits 61 to 66 inclusive, conduits 71 to 76 inclusive, conduit 55, the interior of the valve chamber 50, valve 60, ports and conduits 61' to 67' inclusive and ports and conduits 71' to 76' inclusive, and the return conduits 67 and 90. In the use assumed the motive power of the engine of the automobile is applied to drive the shaft 5, and desiring to transmit the power to the driven shaft 51 my invention would take the place of the transmission gears and clutches commonly used between the engine shaft and the differential gear shaft. When the said shaft 5 is rotated the circular shaft piece 9 will be rotated with said shaft as its axis, and being set at an incline as to said shaft, as said member 9 is rotated the annular member 7 which does not rotate will be oscillated, as guided by the rollers 13, which are mounted on the projections of the lugs 8'. and operate between the wearing plates 11. And through the dumb-bell connecting rods 16 the pistons 22 will be operated as pumps to force the oil to flow from one side of said partition member 33 to the other, and if the flow or passage of said oil is impeded by the elements connected with the driven shaft 51 the power will be transmitted to said shaft in proportion to said impediments. As the pistons are all alike and the valve action of each the same I will describe but one. When the piston 22 is operated on the outward stroke, the oil in said chamber 21 will be forced through the central opening 27 of the plug 26, and the valve 31 will be forced open and oil will pass through the ports 34 into the chamber 40. From said chamber 40, the oil will pass first into the conduit 56 as directed by the valve 60 and then into the interior of said valve 60, and from the interior of said valve through the ports which are in alinement with the alined port in the casing of said valve and through the desired rotor disk $a$ to $f$ to impart the power through its rotor to the driven shaft 51 and thereby to the rear wheels of the automobile as desired. From the said chamber 40 the oil will flow through the conduits 56 and 55 to the interior of said valve 60. With said valve turned to neutral position the ports 90 of said valve and its casing will be in alinement, and the flow will be through said ports 90 and the conduit 67 to the interior of said casing 1, and no power will be transmitted to said shaft 51. If the operator wishes to reverse he will then move the said lever 100 and through the bevel pinion and gear will partially rotate said valve 60 to a position where the ports 71 to 76 inclusive of the valve will be in alinement with the ports 71' to 76' of said casing, and open the lateral conduits 71' to 76' of all of said rotor disks $a$ to $f$, and all of said rotor disks will have a flow of oil through their conduits 46', which flow will drive the vanes 53 in the direction of the arrow $s$, known as the reverse. (See Fig. 12). The flow of oil will be out of said rotor disks through said ports 61 to 66 to the longitudinal conduit 68, which is long enough to receive the flow from all of said ports 61 to 66 inclusive, and from conduit 68, through the port 67 of the valve casing into the interior of said casing 1. Then to return to the neutral position the valve 60 is rotated so that ports 90 are open. All other ports will then be closed, and the flow will be through the interior of said valve and ports 90 and conduit 67, (see the position of the valve 60 in Fig. 12 for neutral position) to the interior of said casing 1. Then desiring to move the automobile forward at low speed the said valve is again partially rotated to close the ports 90 in the valve and casing, and open ports 61 to 66 inclusive of the valve into ports 61' to 66' of the casing and the flow of the oil will be divided and directed through all of the conduits 61' to 66' of the rotor disks $a$ to $f$ inclusive and through their conduits 46', in the direction opposite the arrow $s$, and out through conduits 71' to 76' into the longitudinal conduit 68 and return conduit 67 to the interior of said casing 1. The dividing of the flow of oil and causing it to flow through all of said rotor disks will increase the power and decrease the speed, and in that way transmit low speed to said shaft 51, continuing the partial rotation of said valve in the same direction, will close port 61 of the valve and cut out the flow of oil through the rotor disk $a$, continuing the said rotation of the valve will next cut out rotor $b'$, and then by further rotation, the rotor $c'$. The position of the valve will then be as shown in Fig. 18. With the valve so positioned the ports 64 to 66 inclusive of the valve will be opened into the ports 64' to 66' of the casing and rotor disks $d$, $e$, and $f$, and the flow of oil will be through the conduits 46 and 46' of said rotor disks $d$, $e$, and $f$ and out through the conduits 74', 75' and 76' into and through the longitudinal conduit 68 and return conduit 67 to the interior of said casing 1, and intermediate speed will be transmitted to the shaft 51. When the flow of oil is as just described or in the direction to transmit power and drive the automobile forward it will be opposite the direction of the said arrow $s$, and as the vanes 53 pass the point marked $y$—$x$ in Fig. 12 the movements of the vanes 53 will be controlled radially by the cam rollers 54 as they move in the eccentric portion of said cam track $x$—$x$, and the semi-circular end of said vanes will come into contact with the outer face of said conduit 46' and continue for about one half of the circle. The pressure of the oil will be on what may be called the rear side of said vanes, and some of the oil will enter the hole 86 of the vanes and push the plunger 49 of said vanes outward, and move the contact ring 48 outward sufficiently to make a packing contact between said rings 48 and the wall of said conduits 46'. When the vanes have reached the other point in their circle of travel shown at $x'$ the cam rollers 54 will enter the other eccentric portion of said cam track 47 and the vanes will be moved radially inward, so that by the time they are at points marked $x^2$ and as they pass from $y$ to $y$ in their travel the conduit 46' is cut out and the contact of the vanes is confined to the recess 46 which is concentric, so that as the ports and conduits 74' 75' and 76' are open the oil will flow therethrough and into the conduit 68 and be returned to the interior of said casing 1. Any tendency to cause a vacuum in said chambers 21 will be relieved by the ports 25 cut radially in the walls of said chambers 21. Any tendency to create a vacuum in the said rotors which may be cut out, by the rotation of said valve and the closing of their ports, will be prevented by the openings 94 which are cut in the outer face of said valve 60 and using the previous description of the said rotors $a'$, $b'$, $c'$ being cut out by the closing of their respective ports 61, 62 and 63, the longitudinal portion of said openings 94 will be connected with said conduit 68 whenever said valve 60 is rotated far enough to close any of said ports 61 to 63 inclusive. One cycle of travel of oil will be as follows:—

From the interior of said casing 1 through the ports 25′, annular conduit 30, ports 27′ to the interior of said piston chambers 21, by the suction of the pistons 22; then by the force of said pistons out through the opening 27, by the valve 31, through the ports 34 into the chamber 40; then through the conduits 55 and 56 to the valve chamber 50. Then for the neutral cycle the flow will be through the interior of said valve 60 which I have also shown as 55′ in Figs. 2 to 7 inclusive, and out through the ports 90 of the valve and casing, and the conduit 67 to the interior of casing 1. For the reverse cycle the flow will be through the interior 55′ of said valve through all of the ports 71 to 76 inclusive of the valve, the ports and conduits 71′ to 76′ of the casing and all of the rotor conduits 46′, conduits 61′ to 66′ of the rotors and casing, longitudinal conduit 68, and return conduit 67 into said casing 1. For the forward cycle the flow will be through the interior of said valve 60, the ports 61 to 66 inclusive, as desired of the valve, the coacting conduits 61′ to 66′ of the rotors not cut out, the respective conduits 71′ to 76′ the longitudinal conduit 68 and return conduit 67 into said casing 1.

Using Fig. 18 in this illustration, the flow of the oil through the valve 60 will be outward through the ports 64, 64′ into the conduit 46′, where it will contact with and drive the vanes 53, and as said vanes are carried in the rotor $d$ which is keyed on the shaft 51, it will rotate said shaft, and the oil will flow around the conduit 46′ and through the return conduit 74′, and from the return conduit 74′ it will enter the return conduit 68 in the outer wall of the valve 60, and discharge or return through the conduit 67 to the interior of said casing 1. The ports 61 to 68 increase laterally in size so that the partial rotation of said valve will close all of one port and portions of the remaining ports, as for instance the closing of port 61 will leave a portion of ports 62, 63, 64, 65 and 66 open. The purpose being, to leave the area open equal to the area of the flow passing through conduits 55 and 67. If for any reason the rotors $a$ to $f$ inclusive should not rotate or be able to carry the shaft 51 with its load the oil would be forced out through the safety valve 89 by compressing the spring 90′ and will then flow through the ports 92 and into the return conduits 67, and to the interior of said casing 1. If at any time the valve 60 should be rotated so that all of the ports 61 to 66 inclusive are closed the flow of the oil will be through the port 90 in the valve, port 90 in the valve casing and through the conduit 67 into the interior of said casing 1. The rotation of said valve 60 is secured through the bevel pinion 84 and bevel segment gear 85 when moved by the lever rod 100.

I have thus described and shown a new and novel inclined rotor, with new means for connecting it with pumps operated within an oil filled casing. Also new and novel rotors secured on the driven shaft with a new valve for directing the flow of oil through all or, any of said rotors as desired, whereby any desired speed may be transmitted from neutral to the full speed of the driving shaft, and by decreasing the speed and increasing the amount of oil under motion will increase the amount of power transmitted.

Having thus described my invention I desire to secure by Letters Patent and claim:—

1. In a power transmission machine the combination of a driving shaft; an inclined rotor thereon having annular ball grooves cut in its periphery; an annular member oscillated by said rotor and having annular ball grooves cut in its inner wall; balls in said grooves; pistons connected with and operated by said annular member; chambers in which said pistons are operated; a valve plug in each of said chambers; valves in said plug to direct the flow of oil into and out of said chambers; a driven shaft in alinement with said driving shaft; a plurality of rotors secured on said driven shaft; a plurality of disk plates in which said rotors are operated each having inlet and outlet conduits cut therein; and a valve to direct and control the flow of oil to all or any one of said disk plates as desired.

2. A power transmission machine comprising a driving shaft; an inclined rotor secured on said shaft at an incline from its axis and having ball grooves cut in its periphery; an annular member carried on and oscillated by said rotor and having annular ball grooves cut in its inner wall; balls in said grooves; a casing in which said rotor and annular member are operated; a plurality of piston chambers secured in said casing; pistons operable in said chambers and connected with said annular member; valves to control the flow of oil into and out of said chambers; a driven shaft; a plurality of rotors secured on said driven shaft; disk plates in which said rotors are operated each having oil conduits cut therein; and a valve to direct and control the flow of oil to all or any one of said disk plate conduits.

3. A power transmission machine comprising a driven shaft; a rotor secured thereon set at an incline as to its axis; a casing in which said rotor is operated; a plurality of piston chambers within said casing; pistons operated by said rotor in said chambers to force oil out of and into said casing; a driven shaft; a plurality of rotors secured on said driven shaft; disk plates in which said last mentioned rotors are operated and having oil conduits cut in each; and a valve to direct the flow of oil from said first mentioned casing to either of said disk plates as desired and control its return to said casing, said valve consisting of a cylindrical casing having a portion inwardly curved to form a longitudinal conduit in its wall and other portions of its wall cut out to form ports of ingress and egress; and a casing for said last mentioned valve having ports cut in its wall to coact with the ports in said valve and connect with the oil conduits in said disk plates.

4. A power transmission machine comprising an oil filled casing; chambers in said casing; pistons operable in said chambers to force oil out of said casing; a driving shaft with which said pistons are connected; a driven shaft in alinement with said driving shaft; a plurality of rotors secured on said driven shaft; a like number of disk plates within which said rotors are operated each having conduits cut therein; and a valve to direct a flow of oil to any one or all of said rotors as desired to rotate said driven shaft.

In testimony whereof I have affixed my signature.

PETER R. PETERSON.